2,804,896
ROTARY HOUSEHOLD GRATER

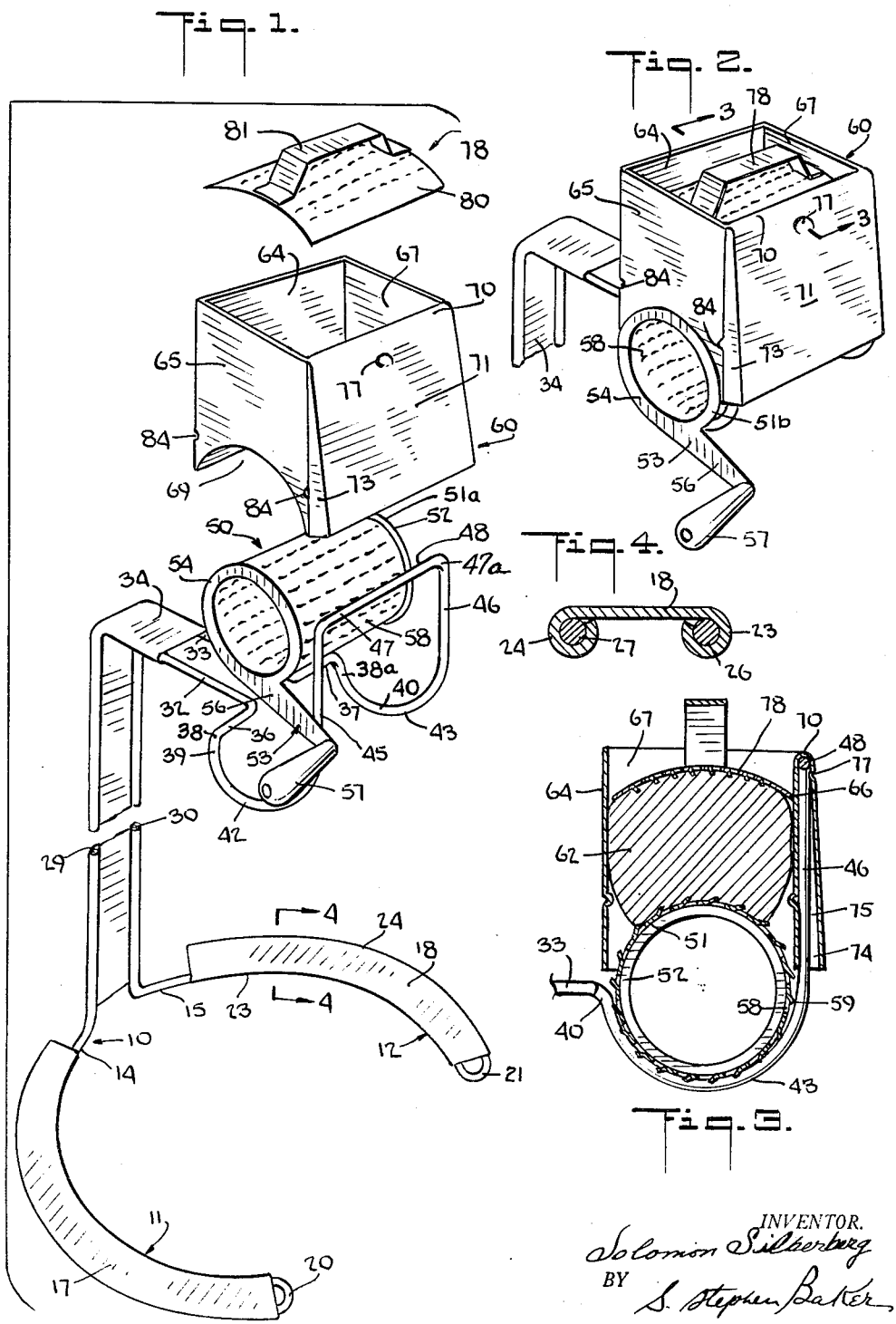

Solomon Silberberg, Bellerose, N. Y.

Application December 15, 1955, Serial No. 553,383

7 Claims. (Cl. 146—177)

The present invention relates to rotary graters or slicers and more particularly to household graters which may be rapidly and conveniently assembled for use and disassembled for cleaning.

The grater of the present invention is particularly well suited to the slicing or grating of potatoes, cheese and other food items. It is therefore essential that the grater or slicer be thoroughly cleaned after each use.

A feature of the invention resides in the unusual ease with which it may be disassembled to permit all parts of the grater to be thoroughly cleaned by ordinary household utensil washing methods.

Another feature of the invention resides in the extreme simplicity of the grater construction which makes its cost of manufacture outstandingly economical.

Generally, the invention comprises a skeleton formed of a single length of wire, the wire being bent to provide a base, an upright supporting column, a pair of curved parallel arms for freely rotatably supporting the rotary grating member and an upright framework for supporting and positioning the removable hopper, the hopper being provided with a pocket for receiving the upright framework. The device further includes a perforated follower member disposed within the hopper for gripping the article of food being sliced or grated while it is fed downwardly against the revolving rotary member of the grater. The wire skeleton is strengthened at its base and upright column portions by metal strips which are bent over along their respective longitudinal edges to grip parallel reaches of the skeleton by being wrapped around the spaced wires.

Other features and advantages of the invention will become apparent upon reading the following specification together with the accompanying drawing forming a part hereof.

Referring to the drawing:

Figure 1 is an exploded perspective view of a rotary grater or slicer embodying the invention;

Figure 2 is a fragmentary perspective view of the grater of Figure 1 showing the several parts assembled and ready for operation;

Figure 3 is a sectional view in elevation taken along the line 3—3 of Figure 2, looking in the direction of the arrows; and Figure 4 is an enlarged transverse sectional view through a curved arm of the base, taken along the line 4—4 of Figure 1, looking in the direction of the arrows.

Referring to Figure 1, the grater comprises a skeleton designated generally as 10 and which is formed of a single continuous length of stiff metal wire. The base of the grater comprises two flat arcuate convergently curved arm portions generally designated as 11 and 12 which are shaped to embrace the base of a bowl (not shown) for receiving the sliced or grated food. The arms 11 and 12 consist of lower terminal portions 14 and 15 of the wire skeleton 10 strengthened, respectively, by convergently curved stiffening strips 17 and 18. The terminal portions 14 and 15 of skeleton 10 are bent at 20 and 21 so that each is doubled back upon itself to form spaced concentrically curved reaches which are received within and held by the curved metallic stiffening strips 17 and 18, the free ends of the terminal portions 14 and 15 of skeleton 10 being located just within the adjoining ends of stiffening strips 17 and 18. This permits the free ends of skeleton 10, which are not visible in the drawing, to be left unfinished and sharp as cut by a wire cutting machine without danger of injury to a user of the grater.

The longitudinal edges of the stiffening strips 17 and 18 are roller or otherwise wrapped around the wires of the concentrically curved reaches of skeleton 10 as may best be seen in Figure 4. In Figure 4, the inner and outer longitudinal edge portions 23 and 24 of stiffening strip 18 are shown tightly wrapped around the inner and outer concentrically curved reaches 26 and 27, respectively, of terminal portion 15 of skeleton 10, the two reaches 26 and 27 having a common terminus at bend 21. The other arm 11 is similarly constructed and is therefore not described in detail.

From the lower terminal portions 14 and 15, the central portion of skeleton 10 intermediate its ends extends vertically upwardly in two parallel reaches 29 and 30 respectively, forming a vertical supporting column. At the upper ends of vertical reaches 29 and 30, the skeleton 10 is bent to extend horizontally in two parallel reaches 32 and 33 which are extensions of vertical reaches 29 and 30, respectively. The vertical reaches 29 and 30 are enclosed within a stiffening strip 34 as described above in connection with Figure 4. The upper end portion of stiffening strip 34 is bent so that it extends horizontally and encloses contiguous portions of horizontal reaches 32 and 33 along with vertical reaches 29 and 30, the bend in stiffening strip 34 giving it an inverted L-shaped configuration when viewed in side elevation.

The horizontal reaches 32 and 33 are bent outwardly away from each other in a common horizontal plane to form two short aligned reaches 36 and 37. The aligned horizontal reaches 36 and 37 terminate at their outer ends 38 and 38a in short downwardly curved extensions 39 and 40 (Figure 3), which merge into laterally spaced parallel and coaxial semicircular reaches 42 and 43. The semicircular reaches 42 and 43 merge into upwardly extending spaced parallel rectilinear vertical reaches 45 and 46. The vertical reaches 45 and 46 are interconnected at their upper ends 47 and 47a by a horizontal crossbar reach 48 forming an upright framework.

The grater further comprises a rotatable hollow cylindrical grating member designated generally as 50. The grating member 50 includes a hollow cylindrical body 51 formed of sheet metal or thin-walled metal tubing. A flat annular flange 52 is fixed to one end 51a of body 51. A crank member, designated generally as 53, is fixed to the other end 51b of body 51. The crank member 53 comprises a flat annular flange portion 54, coaxial with body 51 and flange 52. Extending tangentially from flange portion 54 is an arm portion 56. Freely rotatably disposed at the free end of arm portion 56 is a crank handle 57 for turning the rotary grating member 50. The cylindrical body 51 of grating member 50 is shown with regularly spaced parallel axially extending rows of sharp-edged grating apertures 58 formed therein. The apertures 58 are provided with sharp cutting edges 59 arranged for cutting action when the crank handle 57 is manipulated to rotate grating member 50 in a clockwise direction as viewed in Figures 1, 2 and 3.

It is to be understood that the sharp-edged apertures 58 may take the form of circular holes or elongated slots instead of the shape illustrated, in accordance with the characteristics of the food to be grated or sliced and the desired size and shape of the finished pieces to be produced.

Additionally, the grater comprises a hopper unit designated generally as 60, preferably formed of sheet metal. The hopper unit 60 is adapted to hold an article of food to be grated such as a potato 62 shown in Figure 3. The hopper unit 60 is open at its top and bottom and comprises four lateral enclosing walls 64, 65, 66 and 67 which laterally confine the material to be grated. The lateral enclosing wall 64 is of generally rectangular shape. The wall 65 is cut away at its lower edge to provide a recess 69 which receives and guides the rotary grating member 50. The opposite wall 67 is similarly cut away so that the grating member 50 is suitably guided at both ends.

The lateral wall 66 further comprises an integrally formed extension which is bent downwardly at 70 to provide an exterior wall 71 external to and spaced from the lateral wall 66. The exterior wall 71 is connected to wall 66 along its upper edge by bend 70 and is inclined from the vertical so that it diverges downwardly and outwardly away from lateral wall 66. The exterior wall 71 is provided with inwardly directed flange portions 73 and 74 which, together with lateral wall 66, exterior wall 71 and bend 70 define a laterally closed pocket 75, open at its bottom and closed at its top by bend 70. The pocket 75 is adapted to receive the upright framework consisting of spaced parallel vertical reaches 45 and 46 of the wire skeleton 10 together with their interconnecting crossbar reach 48.

Near the top of pocket 75, a springy locking tongue 77 is pressed out of the metal of exterior wall 71. When the hopper 60 is positioned on skeleton 10 above rotary grating member 50, the crossbar reach 48 becomes seated in the top of pocket 75 formed by bend 70 and is yieldingly locked in the top of pocket 75 by the resilient pressure of locking tongue 77. The hopper 60 may be removed by exertion of a sufficient amount of upward force thereon to overcome the locking action of the springy tongue 77. Similarly, the hopper 60 may be positioned on skeleton 10 by insertion of the reaches 45, 46 and 48 in the pocket 75 and exerting sufficient downward force on hopper 60 to force the cross bar reach 48 home past the springy locking tongue 77 so that it seats in the top of pocket 75.

With the hopper 60 positioned on skeleton 10 above the rotary grating member 50, axial movement of grating member 50 is prevented by engagement of the flange 52 with semicircular reach 43 of skeleton 10 and enclosing wall 67 of hopper 60. Axial movement in the opposite direction is prevented by engagement of flange portion 54 of crank member 53 with semicircular reach 42 of skeleton 10 and enclosing wall 65 of hopper 60. The rotary grating member 50 is freely rotatably supported by the semicircular reaches 42 and 43 of skeleton 10 and upward movement is prevented by the circular recess 69 formed in enclosing wall 65, a similar recess, not visible in the drawing, being provided in the opposite enclosing wall 67.

With an article of food, such as the potato 62, placed in the hopper 60 a follower member 78 is inserted in hopper 60 and manually pressed down on top of the potato 62. The follower member 78 comprises a cylindrically curved body portion 80, formed of sheet metal, for example. A handle member 81 has its opposite ends secured to opposite end edge portions of curved body 80. The body 80 has spaced parallel rows of downwardly protruding sharp projections or serrations 83 formed therein, as by a piercing operation. The body 80 fits nicely and freely vertically slidably into the inside of hopper 60, being guided for vertical movement by the lateral walls 64—67. The projections 83 dig into the top of potato 62 and prevent it from rolling over and over when rotary grater member 50 is turned, thus assuring positive grating cooperation between the bottom of potato 62 and the cutting edges 59 of grating apertures 58. Downward movement of follower member 78 is limited by four horizontally co-planar inwardly extending deformations 84 located at the corners of hopper 60. These deformations prevent destructive engagement between the cutting edges 59 and the projections 83 after the potato 62 has been substantially completely grated.

From the foregoing, it will be seen that the grater may be quickly and easily assembled for use or disassembled for cleaning after use. The parts are of simple and rugged construction assuring long trouble free service. Moreover, the parts are so constructed and arranged that they may be produced economically and in large quantities by conventional automatic metal working machinery.

While I have shown what I believe to be the best embodiments of my invention, it will be apparent to those skilled in the art that many changes and modifications may be made therein without departing from the spirit and scope of the invention as defined in the appended claims.

What is claimed is:

1. A rotary grater of the class described, comprising in combination a hollow cylindrical grating member, an integrally formed wire skeleton, said skeleton comprising lower terminal reaches defining a base for said grater, spaced parallel coaxial circular reaches for rotatably supporting said grating member and further reaches extending vertically above said circular reaches, and a hopper member having a pocket formed at one side thereof in which said vertical reaches are removably received, said vertical reaches, when inserted in said pocket, positioning said hopper above said grating member for feeding material to be grated thereby.

2. A grater according to claim 1, wherein said wire skeleton comprises spaced parallel reaches disposed intermediate said terminal reaches and said parallel circular reaches to provide a vertical supporting column, said grater further comprising at least one stiffening strip extending along and between said supporting column reaches, the longitudinal edge portions of said supporting strip being wrapped around portions of the wire of said skeleton included in said supporting column reaches.

3. A grater according to claim 1, in which said lower terminal portions of said wire skeleton are curved convergently toward each other forming arms for receiving a bowl therebetween, each of said arms consisting of an end portion of said wire bent back upon itself to provide two concentrically curved circular reaches, said grater further comprising a stiffening strip for each arm, each stiffening strip being curved to extend along and between the two of said concentric reaches included in one of said arms with its lateral edge portions wrapped around the wire included in the portions of said reaches along which said stiffening strip extends.

4. A rotary grater of the class described, comprising in combination a hollow cylindrical grating member, means connected with said grating member for rotating the same, an integrally formed wire skeleton comprising lower terminal reaches defining a base for said grater, spaced parallel coaxial circular reaches for rotatably supporting said grating member near its ends, and spaced parallel rectilinear reaches extending from said circular reaches vertically upwardly above said grating member, and a hopper member of generally rectangular shape comprising four enclosing walls, said hopper member having an exterior wall spaced from one of said enclosing walls and defining therewith a pocket in which said rectilinear reaches are removably received for positioning said hopper above said grating member, said hopper, when positioned above said grating member, being adapted to feed material to be grated thereto.

5. A grater according to claim 4, in which said rectilinear reaches are interconnected at their upper ends by a horizontal crossbar reach portion of said skeleton, and in which said exterior wall is joined along its upper edge to the one of said enclosing walls with which it defines said pocket to close said pocket at its top, said crossbar reach being removably seated in said closed top of said pocket.

6. A grater according to claim 5, further comprising releasable locking means disposed near the top of said pocket, said locking means being engageable with said crossbar reach for holding said crossbar reach seated in the top of said pocket.

7. A rotary grater of the class described, comprising in combination a hollow cylindrical grating member, a base for rotatably supporting said grating member, said base comprising an upwardly extending portion, a hopper frictionally and removably mounted on said base for feeding material to be grated to said grating member, said hopper having arcuate sides embracing the sides of said cylindrical grating member when said hopper is frictionally applied to said base, a follower member slidably disposed in said hopper, said follower member having projections formed on the lower surface portions thereof for engagement with said material to be grated, and limiting means carried by said hopper and engageable with said follower member for limiting downward movement of said follower member and preventing damaging engagement between said projections and said grating member after said material has been substantially completely grated, said limiting means comprising deformations formed in said hopper and extending inwardly into the interior thereof, said hopper having a pocket formed therein with a normally downwardly directed mouth in which said upwardly extending portion of said base is removably received.

References Cited in the file of this patent

UNITED STATES PATENTS 2,502,867    Mantelet _____ Apr. 4, 1950

FOREIGN PATENTS 259,017    Italy _____ June 12, 1928
416,319    Great Britain _____ Sept. 11, 1934